Aug. 8, 1967 K. G. ANDERSON 3,334,735

PACKAGE

Original Filed Aug. 28, 1963

United States Patent Office 3,334,735
Patented Aug. 8, 1967

3,334,735
PACKAGE
Kelvin G. Anderson, Greer, S.C., assignor to W. R. Grace & Co., Duncan, S.C., a corporation of Connecticut
Original application Aug. 28, 1963, Ser. No. 305,045. Divided and this application June 2, 1966, Ser. No. 566,173
2 Claims. (Cl. 206—46)

This application is a division of my prior copending application Ser. No. 305,045, filed Aug. 28, 1963, now Patent No. 3,273,301, granted Sept. 20, 1966.

This invention relates to wrapping methods, devices for performing the same and the packages made thereby. In particular, the invention relates to methods and means for wrapping round or cylindrical objects in limp, flexible, organic thermoplastic films and to the packages produced.

A wide variety of wrapping machines are known to the art. For the most part, these have been designed for use with paper or with films of regenerated cellulose or cellulose derivatives, e.g., cellophane. While these machines are generally satisfactory for the purposes for which they are designed serious problems occur in attempting to adapt them for use with the newer organic thermoplastic films such as thin, limp, flexible films of polyethylene, polypropylene, polyethylene terephthalate, polyvinyl chloride, polystyrene, polyvinylidene chloride and the like. No satisfactory solution has been found for the problem of holding these thin films in position while they are being transported through the stations of known wrapping machines. Consequently frequent wrinkling and bunching occurs, resulting in a high number of rewraps, costly shut downs, or unsightly packages. Some not inconsiderable difficulty also arises in keeping the film wrapped about the packaged product until the package is sealed.

It is a general object of this invention to expand the utility of the methods described in the aforementioned copending application. A specific object is to provide methods and means for rapidly and securely wrapping rounded or cylindrical objects in a sheet of thin, limp, flexible organic thermoplastic film. Another specific object is to provide means for automatically, rapidly and securely wrapping objects in a sheet of thin, limp, flexible organic thermoplastic films which means include a minimum number of mechanical elements. Yet another object is to provide a package comprising a round or cylindrical object or a plurality of such objects wrapped in a sheet of organic thermoplastic film. Further objects, as well as the many advantages of the invention will become apparent to those skilled in the art in view of the following detailed description, together with the accompanying drawings, in which:

Figure 1:
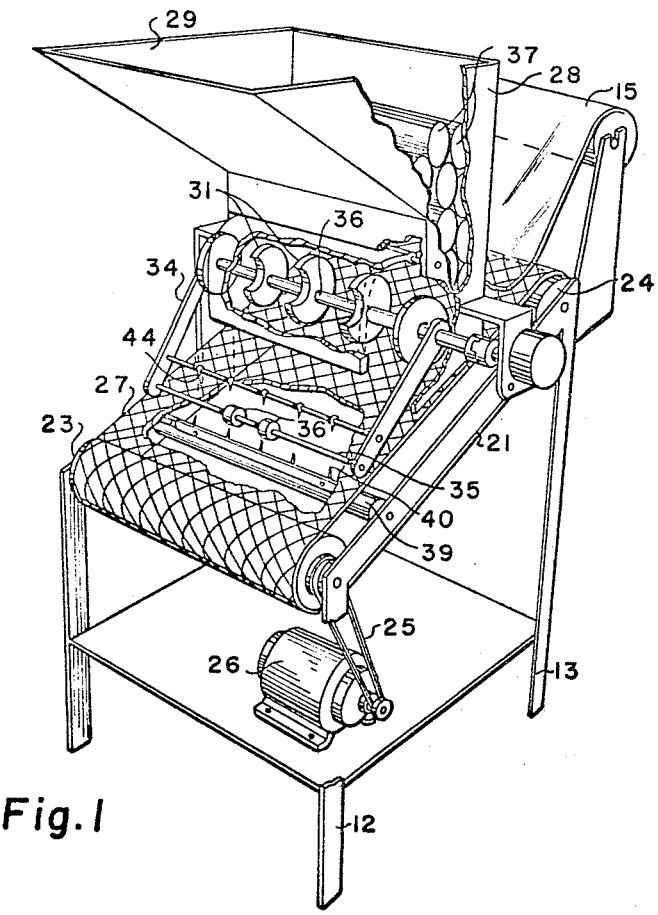
FIGURE 1 is a perspective view, taken from the delivery end, of one embodiment of the invention.

In accordance with this invention an object, preferably a cylindrical or round object, is wrapped in a sheet of organic thermoplastic film by rotating the object between at least one pair of diametrically opposed electrodes, establishing a high voltage direct current (D.C.) potential between the opposed electrode pairs, feeding a film sheet between the object and one of the electrodes and continuing rotation of the object until the sheet is overlapped to form a tube around the object. The electrostatic forces exerted on the film interposed between the object and one electrode force the film into intimate contact with the object. Preferably the film sheet is sufficiently large to extend completely around the circumference of the object and in addition have at least a slight overlap. As the product and film held thereon rotate past the other of the two electrodes the film sheet is oppositely charged, so that the overlapped areas will bear opposite charges and be firmly held together about the object.

In the drawings there is illustrated a device designed in accordance with this invention to wrap tubular rolls of shelf paper, wall paper and other like items.

The illustrated device comprises a suitable supporting frame including legs 11, 12, 13, etc.; upper end rails (omitted for the sake of clarity) and upper side rails 21. The side rails are most preferably constructed of an electrically insulating material such as any one of the well known rigid plastics, e.g., polymers of acrylic acid esters commercially sold under the trade name Lucite.

Extending between and journalled in the side rails are conveyor drive rolls 23, 24. These are also preferably made of electrically insulating material. Driven roll 23 is powered by a suitable sprocket connection (not shown) to chain 25 which is in turn powered by drive motor 26. Stretched around the two rolls 23, 24 is an endless conveyor 27. The rolls are rotated in a suitable manner so that the direction of travel of the conveyor upper run is from the high end toward the low end of side rails 21.

The conveyor 27 must be composed of an electrically insulating material. In addition, the conveyor must have a high ratio (i.e., about 1:1 or more) of open surface area to closed surface area. This can be accomplished by using a plurality of parallel endless round belts spaced apart for a distance at least equal to the diameter of the individual belts. A somewhat simpler and preferred conveyor comprises a reticular belt. Such reticular belt could, for example, be made from the commercially available polyethylene mesh sold under the trade name Vexar.

In a fully automatic machine there is a film dispenser (not shown) for periodically supplying a sheet of wrapping film to the feed (upper) end of the conveyor, e.g., from the film supply roll 15. Any one of a wide variety of art-known and/or commercially available film dispensers can be used for this purpose.

A pair of upwardly extending support plates 28 is secured to the side rails intermediate the ends of the conveyor. These support the product dispenser that is needed for fully automatic operation. In the device illustrated the product dispenser comprises a hopper 29 with a rotatable product supply gate extending across the open bottom mouth. The gate is made up of a series of circular discs 31 each rigidly fixed on reciprocally rotatable shaft 32. The perimeter of each disc is partially cut away to form a recess 33 (see FIGURES 2a and 2b). Also secured to shaft 32 on each side of the hopper is an arm 34 extending generally parallel to the conveyor and forwardly of the hopper. A stop assembly comprised of fixed rod 35 and freely rotatable wheels 36 mounted thereon is fixed between the free ends of the arms transversely of the conveyor. The wheels are at least slightly spaced from the surface of the conveyor. Preferably all parts, and especially the supply gate, arms 34, and stop assembly, are composed of electrically insulating material, e.g., Lucite. The hopper 29 may be made of conductive material, e.g. metal, if sufficiently spaced from the stop assembly.

Figure 2A:
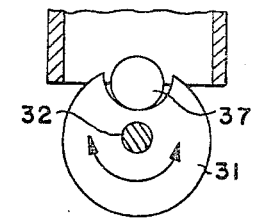
FIGURES 2a and 2b are elevation views schematically illustrating a suitable feeding element useful in practicing the invention.
Figure 2B:
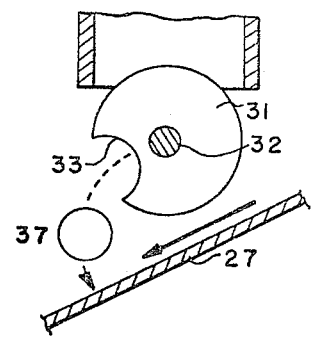

From an inspection of FIGURES 2a and 2b, it will be seen that rotation of shaft 32 in a clockwise direction through an angle of about 120° will bring the recesses 33 into communication with the bottom hopper mouth. A single roll 37 falls by gravity forces into the recesses. As the shaft reciprocally rotates in the opposite direction the roll falls onto the conveyor (not FIGURE 2b) and is carried into contact with the wheels 36 on the stop assembly. Frictional contact between the product and the surface of the conveyor causes the product to rotate in a clockwise direction. After the roll is wrapped in a sheet of wrapping film (in a manner to be subsequently described) the shaft 32 is again actuated so as to rotate clockwise through an angle of about 120°. This raises the stop assembly so that the wrapped roll is released for transportation to the delivery end of the conveyor. At the same time a second roll falls into the communicating recesses 33. Counterclockwise rotation of the shaft dispenses the second roll to the conveyor and brings the stop assembly into position for the next wrapping operation. Any suitable conventional means can be used to power the rotary shaft 32.

It will be apparent that semi-automatic operation is readily feasible simply by manually feeding product to the wrapping station and/or manually releasing the wrapped product from the stop assembly. It will also be apparent that numerous other automatic product dispensers could be used. Further, it should be noted that the specifically illustrated and described stop assembly could be replaced with other equivalent devices. For example the freely rotatable wheels 36 were used in the illustrated device simply to reduce friction between the rotating product rolls 37 and the rod 35. With other products, e.g., rounded objects such as oranges, these frictional forces are not as great so that the wheels can, if desired, be eliminated. In the latter case the rod 35 may be journalled in the arms 34 for free rotation, although even this expedient is not required.

A rigid piece 39 of electrically insulating material, e.g., a rigid polyvinylchloride bar, is placed beneath the upper run of the conveyor slightly to the rear and parallel to the stop assembly and is fixedly secured to the side rails 21, 22. A row of pointed electrodes 40 (in the illustrated device five such electrodes spaced two inches apart were used) is fixedly secured in or on the bar with the points facing upwards and spaced from the undersurface of the conveyor. The other ends of the electrodes were electrically interconnected to each other and the entire set electrically connected via a current limiting resistor of 2–500 megohms to a high voltage D.C. supply (not shown). In this particular machine, spacing between the points and the undersurface of the belt was about one-half inch. This spacing is not particularly critical and can be varied depending upon the voltage applied and the mode of electrode interconnection. As is known to the art, if a separate high value (e.g., 20 to 100 meghoms) resistor is placed in series with each electrode, electrostatic forces generated are much more uniform and the spacing much less critical.

A similar set of pointed electrodes 44 is mounted above the upper run of the conveyor so as to be closely adjacent to but spaced from product rotating beneath. This set of electrodes is parallel to the set beneath the conveyor and substantially diiametrically opposed thereto with respect to product between the two sets. The electrodes 44 are connected in series to each other, and the entire set is connected to ground via the support frame for the machine.

In operation, a roll of shelf paper is dispensed from the hopper onto the conveyor. At about the same time a sheet of wrapping film 17 of suitable size is dispensed or placed on the feed end of the conveyor. When the roll contacts the wheels 36 it is rotated in a clockwise direction by frictional forces resulting from continuous movement of the conveyor beneath it. The electrostatic forces created by the two opposing rows of pointed electrodes charge the surface of the rotating product. The specific polarity is not critical. In the example chosen the electrodes 40 were connected to a source of 40 kilovolt (positive) D.C. power. This charges the product surface passing by the lower electrodes positively. As the surface rotates past the upper set of electrodes 44 the charge is reversed.

Figures 3A, 3B, 3C, 3D:
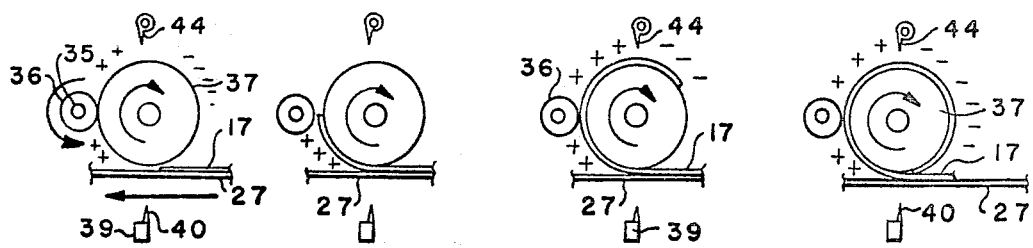
FIGURES 3a through 3d illustrate schematically the steps in the wrapping operation.

This operation is schematically illustrated in FIGURE 3a.

In a short time the sheet 17 of wrapping film is transported by the conveyor beneath the product so that it becomes interposed between the product and the lower set of electrodes. The electrostatic forces now generate a positive charge on the film. Since the product surface at this point is oppositely charged by the upper set of electrodes the film is attracted towards and is firmly held to the surface of the product. As the product continues to rotate the film follows it, until the product is completely wrapped. Reversal of charge as the first film layer passes the upper set of electrodes causes the final, overlapping portion of film to be oppositely charged with respect to the film layer beneath it so that the entire package is held quite firmly together and can withstand considerable manual or mechanical abuse without becoming unwrapped.

The sequence of the charging operations during the wrapping operation is schematically illustrated in FIGURES 3b, 3c and 3d.

Once the film sheet is completely wrapped about the object to be packaged, the operation is repeated by lifting the stop assembly, and dispensing another object and another sheet of wrapping film onto the conveyor.

A wide variety of thin, limp flexible organic thermoplastic films can be used in the method of this invention. Exemplary films include those made from polyethylene (of either high, medium, or low density) polypropylene, ethylene-propylene copolymers, polyvinyl chloride, vinylidene chloride polymers including any of the well known Saran-type copolymers, polystyrene, or any other like material. Thickness of the film can range from one-half mil (.0005 inch) or lower to 5 mils (.005 inch) or higher. The only essential requirement is that the stiffness of the film be low enough to permit the film sheet to be adhered to and smoothly wrapped around the object to be packaged by the electrostatic forces available. The wrapping films used can be nonoriented, or uniaxially or biaxially oriented. The wrapped package can be fully closed by sealing the overlapped film portions in any suitable manner and by closing the ends of the tube by twisting, tying, sealing, clipping, or in any other suitable manner. If the wrapping film is a heat shrinkable oriented film (e.g., an irradiated biaxially oriented film such as described in Baird et al. U.S. Patent 3,022,543) the final closure can be made by heat shrinking the wrapped package made by the present invention. This can be done by using for example the methods disclosed in copending, coassigned U.S. application S.N. 126,202, filed July 24, 1961, now Patent No. 3,215,266; particularly the disclosure with reference to FIGURE 6 of said application 126,202.

In the machine described, forces sufficiently powerful to wrap the known thin (.003 inch or less) organic thermoplastic films can be generated by applying a D.C. voltage of about 40–50 kilovolts or less to the lower set of electrodes 40 and grounding the other set. Similar forces can be generated at lower absolute voltage by connecting both sets of electrodes to a high voltage (e.g., 20–25 kv.) D.C. power supply so that the two sets of electrodes are of opposite polarity. In general it has been found that potentials between the electrode pairs of from about 15 to about 60 kv. (D.C.) are satisfactory for virtually all purposes of this invention.

In the above description the product being wrapped was a cylindrical roll of shelf paper. The invention is also applicable to rounded objects such as oranges, grapefruits, golf and tennis balls, and other like objects. It is also useful for packaging a plurality of objects in a parallel row, e.g., a row of fruit juice cans, beer cans, etc. or a row of golf balls, oranges, etc.

The invention is also applicable to objects of other shape than cylindrical or rounded if means are provided for rotating the object or objects between the opposed electrode sets. The use of auxiliary rotating means also permits use of the invention for wrapping plural rows of objects.

The above description has, by necessity, been quite detailed. It will be apparent that many modifications or substitutions could be made without departing from the scope of the invention as it is defined in the appended claims.

What is claimed is:

1. Package comprising an object, a sheet of organic thermoplastic film drawn around said object and at least partially overlapped to form an open ended tube about said object, said overlapped film portions bearing electrostatic charges opposite from each other and all film portions adjacent the product bearing electrostatic charges opposite from an electrostatic charge applied to said object.

2. Package as defined in claim 1 wherein said object is a cylindrical tube.

References Cited

UNITED STATES PATENTS 2,562,714  7/1951  Hawtof.
2,797,370  6/1957  Bennett.

LOUIS G. MANCENE, *Primary Examiner.*